United States Patent

[11] 3,593,218

[72] Inventor Paul W. Wood
Warren, Mich.
[21] Appl. No. 16,821
[22] Filed Mar. 5, 1970
[45] Patented July 13, 1971
[73] Assignee General Motors Corporation
Detroit, Mich.

[54] PIEZOELECTRIC FILTER NETWORK
5 Claims, 14 Drawing Figs.

[52] U.S. Cl. .......... 333/72, 310/9.8
[51] Int. Cl. .......... H03h 9/00, H03h 9/18, H01v 7/00
[50] Field of Search .......... 333/72, 30; 310/8, 8.1, 8.2, 8.3, 8.4, 8.5, 8.6, 8.7, 9, 9.7, 9.8

[56] References Cited
UNITED STATES PATENTS
3,345,588 10/1967 Chesney .......... 333/72
3,495,105 2/1970 Shimano .......... 310/9.8

*Primary Examiner*—Herman Karl Saalbach
*Assistant Examiner*—Marvin Nussbaum
*Attorneys*—E. W. Christen, C. R. Meland and Tim G. Jagodzinski

ABSTRACT: A plurality of piezoelectric disc resonators are connected to form various filter networks each exhibiting a composite frequency response curve having the desirable selectivity characteristics of the individual frequency response curves of he several resonators. The selectivity of the composite frequency response curves is sufficient to permit the utilization of each of the filter networks as an IF filter in a conventional superheterodyne radio receiver.

INVENTOR.
Paul W. Wood
BY
[signature]
ATTORNEY

INVENTOR.
Paul W. Wood
BY
Jim G. Jagodzinski
ATTORNEY

PIEZOELECTRIC FILTER NETWORK

This invention relates to an electrical wave filter, and more particularly to a filter network including a plurality of piezoelectric resonators.

According to the invention, a plurality of piezoelectric resonators each exhibit individual frequency response curves having desirable selectivity characteristics. The piezoelectric resonators are variously combined to form several filter networks each exhibiting a composite frequency response curve having the desirable selectivity characteristics of the individual frequency response curves. The selectivity of the composite frequency response curves is sufficient to permit the utilization of each of the filter networks as an IF filter in a conventional superheterodyne radio receiver.

The piezoelectric resonators each comprise a ferroelectric ceramic disc having one or the other of two different electrode configurations. In the one electrode configuration, a pair of circular electrodes are concentrically mounted on either side of the ceramic disc. Hereinafter, a piezoelectric disc resonator having this electrode configuration will be referred to as a "-circular electrode" disc resonator. In the other electrode configuration, an additional annular electrode is concentrically mounted on one side of the ceramic disc enclosing the circular electrode mounted on that side of the disc. Hereinafter, a piezoelectric disc resonator having this electrode configuration will be referred to as a "circular-annular electrode" disc resonator.

In one embodiment of the invention, a circular electrode disc resonator is connected in a general series end-to-end relationship with a circular-annular electrode disc resonator. As contemplated by another embodiment of the invention, a pair of circular-annular electrode disc resonators are connected in a general parallel back-to-back relationship. According to a further embodiment of the invention, a circular electrode disc resonator is connected in a general series end-to-end relationship with a pair of circular-annular electrode disc resonators which are connected in a general parallel back-to-back relationship.

The invention may be best understood by reference to the following detailed description of the preferred embodiments when considered in conjunction with the accompanying drawing, in which.

Figure 1:
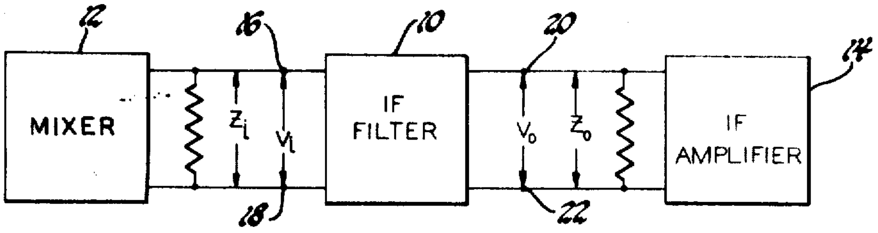
FIG. 1 is a block diagram of a portion of a typical superheterodyne radio receiver.

FIG. 1 discloses a portion of a conventional superheterodyne radio receiver comprising an IF filter 10 connected between a mixer 12 and an IF amplifier 14. The IF filter 10 includes a pair of input terminals 16 and 18 across which an input signal $V_i$ is received, and a pair of output terminals 20 and 22 across which an output signal $V_o$ is developed. The mixer 12 provides an input impedance $Z_i$ across the input terminals 16 and 18, and the IF amplifier 14 provides an output impedance $Z_o$ across the output terminals 20 and 22.

Figure 2:
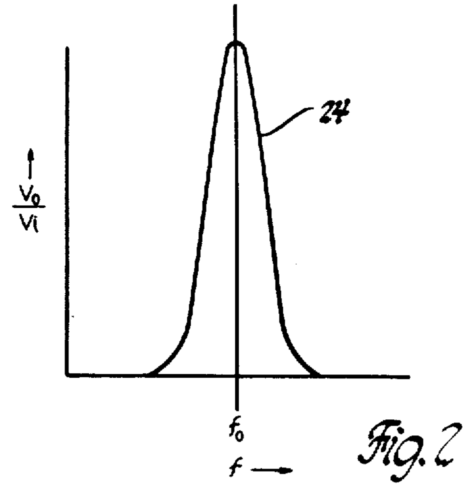
FIG. 2 is a graphic diagram of a standard frequency response curve for a radio receiver IF filter.

FIG. 2 discloses a typical or standard IF frequency response curve 24 for the IF filter 10 shown in FIG. 1. The IF frequency response curve 24 exhibits an overall smooth contour generally symmetrical with respect to an IF center frequency $f_o$. In an AM radio receiver for example, the IF center frequency $f_o$ is approximately 262.5 kHz. Most important, however, the IF frequency response curve 24 displays an abrupt falloff on both high and low frequency sides of the center frequency $f_o$. This abrupt falloff characteristic provides the sharp selectivity required of the IF filter 10 for maximum performance in the illustrated radio receiver IF stage. The selectivity of a filter network may be defined as that property by which the filter network is able to substantially transfer one signal at a desired frequency and to substantially attenuate another signal at an undesired frequency slightly different from the desired frequency. It has been found that the standard IF frequency response curve 24 can be approached by various filter networks constructed with piezoelectric disc resonators having circular electrode configurations and/or circular-annular electrode configurations.

Figure 3:
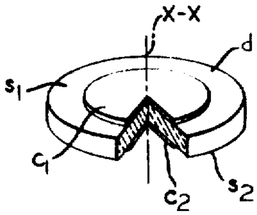
FIG. 3 is a perspective view of a piezoelectric ceramic disc resonator having a circular electrode configuration.

FIG. 3 discloses a piezoelectric disc resonator having a circular electrode configuration. Specifically, the illustrated circular electrode disc resonator includes a thin circular plate or disc *d* having a pair of parallel plane surfaces $s_1$ and $s_2$ extending perpendicular to a central axis X–X. The disc *d* is made of a ferroelectric ceramic material such as lead zirconate-lead titanate. A pair of circular or round electrodes $c_1$ and $c_2$ are concentrically mounted with respect to the axis X–X on opposite ones of the sides $s_1$ and $s_2$ of the disc *d*, respectively. The circular electrodes $c_1$ and $c_2$ are made of electrically conductive material such as silver. It is to be understood that the disc *d* may also be made of some suitable ferroelectric ceramic material other than lead zirconate-lead titanate, and that the electrodes $c_1$ and $c_2$ may be made of some electrically conductive material other than silver.

Figure 4:
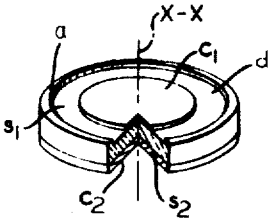
FIG. 4 is a perspective view of a piezoelectric ceramic disc resonator having a circular-annular electrode configuration.

FIG. 4 discloses a piezoelectric disc resonator having a circular-annular electrode configuration. In particular, the illustrated circular-annular electrode disc resonator is generally similar to the circular electrode disc resonator shown in FIG. 3, and like numerals are used to denote like elements. However, the circular-annular electrode disc resonator includes an annular or ring electrode *a* concentrically mounted with respect to the axis X–X on the side $s_1$ of the disc *d* so as to enclose the circular electrode $c_1$. Preferably, the circular electrode $c_1$ of the disc resonator shown in FIG. 3 is somewhat smaller than the circular electrode $c_1$ of the disc resonator shown in FIG. 4. However, it will be appreciated that the relative size of the electrodes $c_1$, $c_2$ and *a* may be altered as necessary.

Figure 5:
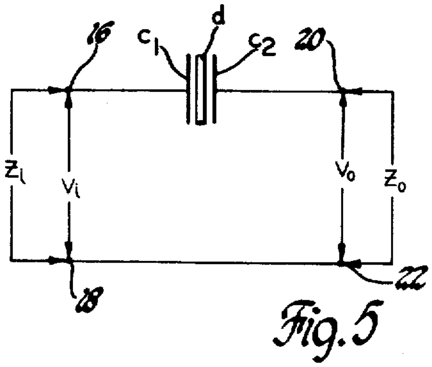
FIGS. 5 and 6 are schematic diagrams of the piezoelectric ceramic disc resonators illustrated in FIGS. 3 and 4, respectively.

FIG. 5 discloses a schematic diagram of a circular electrode disc resonator connected in place of the IF filter 10 as shown in FIG. 1. The circular electrode $c_1$ is connected with the input terminal 16 and the circular electrode $c_2$ is connected with the output terminal 20.

Figure 6:
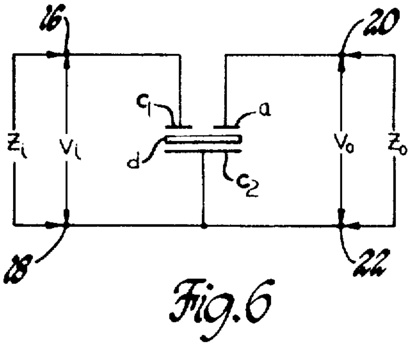

FIG. 6 discloses a schematic diagram of a circular-annular electrode disc resonator connected in place of the IF filter 10 as shown in FIG. 1. The circular electrode $c_1$ is connected with the input terminal 16. The circular electrode $c_2$ is connected with the input terminal 18 and the output terminal 22. The annular electrode *a* is connected with the output terminal 20.

Referring to FIGS. 5 and 6, the desired electrical connections may be made by appropriately soldering wire leads or conductors to the electrodes $c_1$, $c_2$ and *a*. In operation, when an input signal $V_i$ is applied across the input terminals 16 and 18, an output signal $V_o$ is developed across the output terminals 20 and 22. The regions of the ferroelectric ceramic disc *d* between the electrodes $c_1$ and $c_2$ and between the electrodes $c_2$ and *a* are alternately polarized in one direction and then in the opposite direction. Consequently, the disc *d* mechanically resonates in a radial mode. Electrically, the disc resonators behave as series-parallel resonant circuits, exhibiting both a resonance and an antiresonance. However, providing the input impedance $Z_i$ and the output impedance $Z_o$ are each relatively low, the normal antiresonance is suppressed. Accordingly, the disc resonators behave as series resonant circuits, exhibiting only a resonance. For this purpose, a low impedance is taken to fall within an impedance range extending from about 25 ohms to about 75 ohms. Referring to FIG. 1, the provision of an input impedance $Z_i$ and an output impedance $Z_o$ within the previously described impedance range may be conveniently accomplished by the illustrated portion of the conventional radio receiver.

Figure 7:
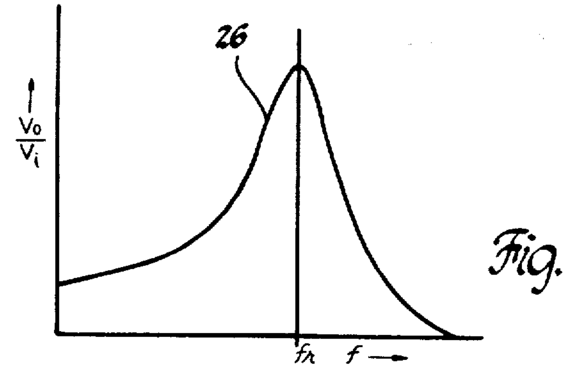
FIGS. 7 and 8 are graphic diagrams of typical frequency response curves for the piezoelectric ceramic disc resonators illustrated in FIGS. 3 and 4, respectively.

FIG. 7 discloses a typical frequency response curve 26 for a circular electrode disc resonator. The frequency response curve 26 exhibits a resonance at a frequency $f_r$ which may be chosen to be equal to the IF center frequency $f_o$. Further, the frequency response curve 26 displays a desirable sharp falloff on the high frequency side of the resonant frequency $f_r$. However, the frequency response curve 26 also displays an undesirable gradual falloff on the low frequency side of the resonant frequency $f_r$. Hence, the frequency response curve 26 does not approximate the standard IF frequency response curve 24 shown in FIG. 2. Consequently, the circular disc resonator illustrated in FIGS. 3 and 5 is not by itself suitable for use as the IF filter 10 in the radio receiver shown in FIG. 1.

Figure 8:
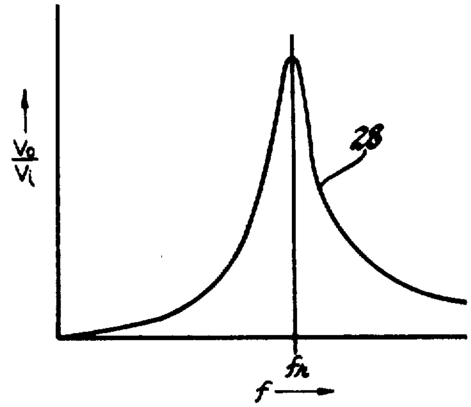

FIG. 8 illustrates a typical frequency response curve 28 for a circular-annular electrode disc resonator. The frequency response curve 28 exhibits a resonance at a frequency $f_r$ which may be chosen to be equal to the IF center frequency $f_o$. Further, the frequency response curve 28 displays a desirable sharp falloff on the low frequency side of the resonant frequency $f_r$. However, the frequency response curve 28 also displays an undesirable gradual falloff on the high frequency side of the resonant frequency $f_r$. Thus, the frequency response curve 28 does not approximate the standard IF frequency response curve 24 shown in FIG. 2. Accordingly, the circular-annular electrode disc resonator illustrated in FIGS. 4 and 6 is not by itself suitable for use as the IF filter 10 in the radio receiver shown in FIG. 1.

Nonetheless, it has been found that piezoelectric ceramic disc resonators having circular electrode configurations and/or circular-annular electrode configurations may be arranged in various combinations so as to form several filter networks suitable for use as the IF filter 10 in the radio receiver shown in FIG. 1. Or, in other words, it has been found that the frequency response curve 26 and/or the frequency response curve 28 may be variously combined to produce several composite frequency response curves which approximate the standard IF frequency response curve 24 shown in FIG. 2.

Figure 9:
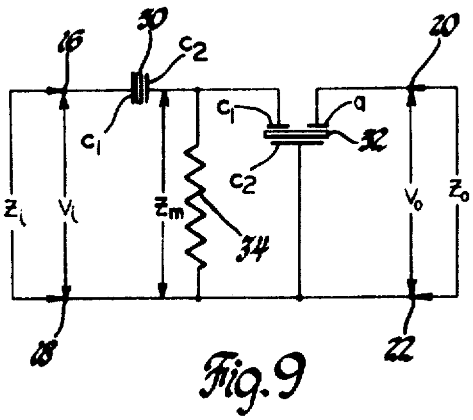
FIGS. 9, 11 and 13 are schematic diagrams of filter networks incorporating the principles of the invention.

FIG. 9 illustrates a filter network including a circular electrode disc resonator 30 and a circular-annular electrode disc resonator 32 connected in a general series end-to-end relationship. The circular electrode $c_1$ of the disc resonator 30 is connected with the input terminal 16. The circular electrode $c_2$ of the disc resonator 30 is connected with the circular electrode $c_1$ of the disc resonator 32. The circular electrode $c_2$ of the disc resonator 32 is connected with the input terminal 18 and the output terminal 22. The annular electrode $a$ of the disc resonator 32 is connected with the output terminal 20. Further, an impedance matching resistor 34 is connected from the circular electrode $c_2$ of the disc resonator 30 and the circular electrode $c_1$ of the disc resonator 32 to the input terminal 18 and the output terminal 22. The resistor 34 provides an impedance $Z_m$ which presents an output impedance for the disc resonator 30 and an input impedance for the disc resonator 32. Preferably, the impedance $Z_m$ is equal to the input impedance $Z_i$ and the output impedance $Z_o$.

Figure 10:
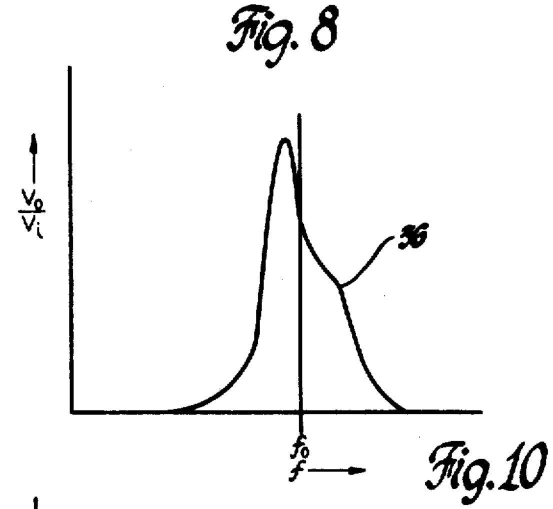
FIGS. 10, 12 and 14 are graphic diagrams of typical frequency response curves for the filter networks illustrated in FIGS. 9, 11 and 13, respectively.

FIG. 10 illustrates a typical frequency response curve 36 for the filter network shown in FIG. 9. Due to the general series end-to-end connection of the disc resonator 30 with the disc resonator 32, the frequency response curve 36 is a composite of the frequency response curve 26 and the frequency response curve 28 superimposed with respect to the resonant frequency $f_r$ which is selected to be equal to the IF center frequency $f_o$. The composite frequency response curve 36 exhibits a desirable sharp falloff on both the high and low frequency sides of the center frequency $f_o$. However, the symmetry of the upper portion of the composite frequency response curve 36 is somewhat degraded on the high frequency side of the center frequency $f_o$. This defect may be remedied by adding an additional circular-annular electrode disc resonator to the filter network as will be later described. Nonetheless, the frequency response curve 36 does approximate the standard IF frequency response curve 24 shown in FIG. 2. Therefore, the filter network illustrated in FIG. 9 is suitable for use as the IF filter 10 in the radio receiver shown in FIG. 1.

Figure 11:
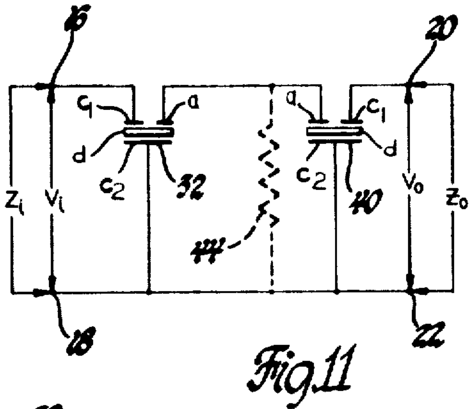

FIG. 11 discloses a filter network including a pair of circular-annular electrode disc resonators 32 and 40 connected in a general parallel back-to-back relationship. The circular electrode $c_1$ of the disc resonator 32 is connected with the input terminal 16. The circular electrode $c_2$ of the disc resonator 32 is connected with the input terminal 18 and the output terminal 22. The annular electrode $a$ of the disc resonator 32 is connected with the annular electrode $a$ of the disc resonator 40. The circular electrode $c_1$ of the disc resonator 40 is connected with the output terminal 20. The circular electrode $c_2$ of the disc resonator 40 is connected with the input terminal 18 and the output terminal 22.

Figure 12:
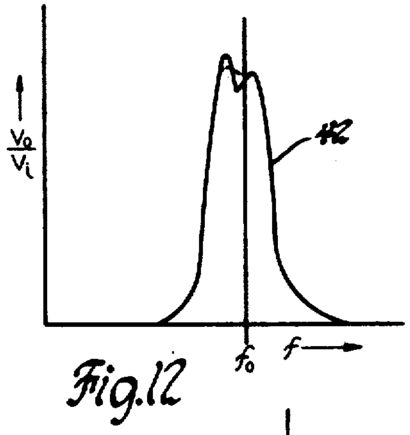

FIG. 12 illustrates a typical frequency response curve 42 for the filter network shown in FIG. 11. Due to the general parallel back-to-back connection of the disc resonators 32 and 40, the frequency response curve 42 is a composite of the frequency response curve 28 and the inverse of the frequency response curve 28 superimposed with respect to the resonant frequency $f_r$ which is selected to be equal to the IF center frequency $f_o$. The frequency response curve 42 exhibits a desirable sharp falloff on the low frequency side of the center frequency $f_o$. However, on the high frequency side of the center frequency $f_o$, the falloff of the frequency response curve 42 is not quite so sharp. This defect may be remedied by adding a circular electrode disc resonator to the filter network as will be later described.

Further, the frequency response curve 42 exhibits an undesirable notch in the top portion as the result of one resonant peak on the low frequency side of the center frequency $f_o$ and another resonant peak on the high frequency side of the center frequency $f_o$. This defect may be remedied by providing a smoothing impedance 44 connected from between the annular electrode $a$ of the disc resonator 32 and the annular electrode $a$ of the disc resonator 40 to the input terminal 18 and the output terminal 22 as shown in dotted lines in FIG. 11. Similarly, the corrected top portion of the frequency response curve 42 is shown in dotted lines in FIG. 12. It is to be noted that the smoothing impedance 44 could be provided by a suitable capacitor rather than a resistor as shown. In any event, the frequency response curve 42 does approximate the standard IF frequency response curve 24 shown in FIG. 2. Therefore, the filter network illustrated in FIG. 11 is suitable for use as the IF filter 10 in the radio receiver shown in FIG. 1.

Figure 13:
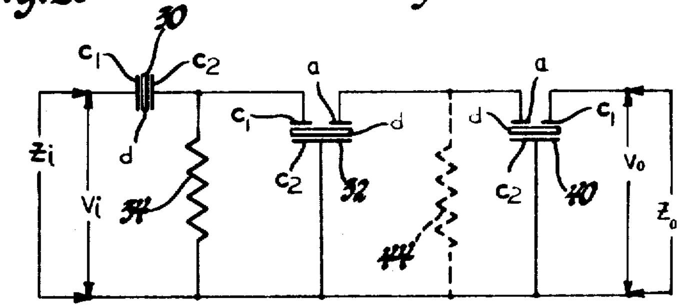

FIG. 13 illustrates a filter network including a circular electrode disc resonator 30 connected in a general series end-to-end relationship with a pair of circular-annular electrode disc resonators 32 and 40 which are connected in a general parallel back-to-back relationship. It will be apparent that this filter network represents a combination of the filter networks illustrated in FIGS. 9 and 11, and like numerals are used to denote like elements. Hence, the filter network illustrated in FIG. 13 represents the filter network shown in FIG. 9 plus the circular-annular electrode disc resonator 40. Similarly, the filter network illustrated in FIG. 13 represents the filter network shown in FIG. 11 plus the circular electrode disc resonator 30. Accordingly, a detailed recitation of the interconnection of the disc resonators 30, 32 and 40, and the resistors 34 and 44 will not be given.

Figure 14:
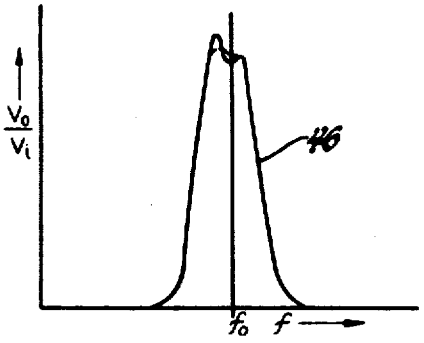

FIG. 14 discloses a typical frequency response curve 46 for the filter network illustrated in FIG. 13. Due to the generally end-to-end connection of the disc resonator 30 with the disc resonators 32 and 40, and the generally parallel back-to-back connection of the disc resonators 32 and 40, the frequency response curve 46 represents a composite of the frequency response curve 26, the frequency response curve 28, and the inverse of the frequency response curve 28 superimposed with respect to the resonant frequency $f_r$ which is again selected to be equal to the IF center frequency $f_o$. Unlike the composite frequency response curve 36, the composite frequency response curve 46 is substantially symmetrical with respect to the center frequency $f_o$. Further, unlike the composite frequency response curve 42, the composite frequency response curve 46 exhibits a desirable sharp falloff on both the high frequency side and the low frequency side of the center frequency $f_o$. Hence, the frequency response curve 46 most closely approximates the standard IF frequency response curve 24 shown in FIG. 2. Consequently, from the standpoint of selectivity, the filter network illustrated in FIG. 13 is the most suitable for use as the IF filter 10 in the radio receiver IF stage shown in FIG. 1.

It will now be apparent that the input terminal 18 and the output terminal 22 are in effect a single common terminal in each of the filter networks shown in FIGS. 9, 11 and 13. Further, it will be appreciated that the frequency response curves illustrated in FIGS. 2, 7, 8, 10, 12 and 14 are not necessarily of the same scale. In any event, it is to be noted that the preferred embodiments of the invention disclosed herein are shown for illustrative purposes only, and that various alterations and modifications may be made to these preferred embodiments without departing from the spirit and scope of the invention.

What I claim is:

1. In an electrical system providing a low input impedance across a pair of input terminals and a low output impedance across a pair of output terminals, a filter network comprising: a first piezoelectric resonator providing a frequency response curve exhibiting a resonance at a given frequency and having a relatively sharp falloff on the high frequency side of the given frequency, the first resonator including a ferroelectric ceramic disc, a first circular electrode concentrically mounted on one side of the disc and connected with one input terminal, and a second circular electrode concentrically mounted on the other side of the disc; a second piezoelectric resonator providing a frequency response curve exhibiting a resonance at the given frequency and having a relatively sharp falloff on the low frequency side of the given frequency, the second resonator including a ferroelectric ceramic disc, a first circular electrode concentrically mounted on one side of the disc and connected with the second circular electrode of the first resonator, a second circular electrode concentrically mounted on the other side of the disc and connected with the other input terminal and one output terminal, and an annular electrode concentrically mounted on the one side of the disc enclosing the first circular electrode and connected with the other output terminal; and a resistor connected from between the second circular electrode of the first resonator and the first circular electrode of the second resonator to the other input terminal and the one output terminal for providing an impedance matching the input and output impedances; whereby the frequency response curve of the first resonator and the frequency response curve of the second resonator are effectively superimposed with respect to the given frequency so as to form a composite frequency response curve for the filter network which is nominally centered about the given frequency and which exhibits a relatively sharp falloff on both the high and low frequency sides of the given frequency.

2. In an electrical system providing a low input impedance across a pair of input terminals and a low output impedance across a pair of output terminals, a filter network comprising: a first piezoelectric resonator providing a frequency response curve exhibiting a resonance at a given frequency and having a relatively sharp falloff on the low frequency side of the given frequency, the first resonator including a ferroelectric ceramic disc, a first circular electrode concentrically mounted on one side of the disc and connected with one input terminal, a second circular electrode concentrically mounted on the other side of the disc and connected with the other input terminal and one output terminal, and an annular electrode concentrically mounted on the one side of the disc enclosing the first circular electrode; and a second piezoelectric resonator providing a frequency response curve exhibiting a resonance at the given frequency and having a relatively sharp falloff on the low frequency side of the given frequency, the second resonator including a ferroelectric ceramic disc, a first circular electrode concentrically mounted on one side of the disc and connected with the other output terminal, a second circular electrode concentrically mounted on the other side of the disc and connected with the other input terminal and the one output terminal, and an annular electrode concentrically mounted on the one side of the disc enclosing the first circular electrode and connected with the annular electrode of the first resonator; whereby the frequency response curve of the first resonator and the inverse of the frequency response curve of the second resonator are effectively superimposed with respect to the given frequency so as to form a composite frequency response curve for the filter network which is nominally centered about the given frequency and which exhibits a relatively sharp falloff on both the high and low frequency sides of the given frequency.

3. In an electrical system providing a low input impedance across a pair of input terminals and a low output impedance across a pair of output terminals, a filter network as recited in claim 2 including an impedance connected from between the annular electrode of the first resonator and the annular electrode of the second resonator to the other input terminal and the one output terminal for smoothing out the top portion of the composite frequency response curve of the filter network.

4. In an electrical system providing a low input impedance across a pair of input terminals and a low output impedance across a pair of output terminals, a filter network comprising: a first piezoelectric resonator providing a frequency response curve exhibiting a resonance at a given frequency and having a relatively sharp falloff on the high frequency side on the given frequency, the first resonator including a ferroelectric ceramic disc, a first circular electrode concentrically mounted on one side of the disc and connected with one input terminal, and a second circular electrode concentrically mounted on the other side of the disc; a second piezoelectric resonator providing a frequency response curve exhibiting a resonance at the given frequency and having a relatively sharp falloff on the low frequency side of the given frequency, the second resonator including a ferroelectric ceramic disc, a first circular electrode concentrically mounted on one side of the disc and connected with the second circular electrode of the first resonator, a second circular electrode concentrically mounted on the other side of the disc and connected with the other input terminal and one output terminal, and an annular electrode concentrically mounted on the one side of the disc enclosing the first circular electrode; a resistor connected from between the second circular electrode of the first resonator and the first circular electrode of the second resonator to the other input terminal and the one output terminal to provide an impedance matching the input and output impedances; and a third piezoelectric resonator providing a frequency response curve exhibiting a resonance at the given frequency and having a relatively sharp falloff on the low frequency side of the given frequency, the third resonator including a ferroelectric ceramic disc, a first circular electrode concentrically mounted on one side of the disc and connected with the other output terminal, a second circular electrode concentrically mounted on the other side of the disc and connected with the other input terminal and the one output terminal, and an annular electrode concentrically mounted on the one side of the disc and enclosing the first circular electrode and connected with the annular electrode of the second resonator; whereby the frequency response curve of the first resonator and the frequency response curve of the second resonator and the inverse of the frequency response curve of the third resonator are effectively superimposed with respect to the given frequency so as to form a composite frequency response curve for the filter network which is nominally centered about the given frequency and which exhibits a relatively sharp falloff on both the high and low frequency sides of the given frequency.

5. In an electrical system providing a low input impedance across a pair of input terminals and a low output impedance across a pair of output terminals, a filter network as recited in claim 4 including an impedance connected from between the annular electrode of the second resonator and the annular electrode of the third resonator to the other input terminal and the one output terminal for smoothing out the top portion of the composite frequency response curve for the filter network.